May 12, 1970
C. V. BOCCIARELLI
3,511,714
CHEMICAL SOURCE OF ELECTRICAL CURRENT, CATALYST SUITABLE
FOR USE THEREIN AND METHOD FOR THE MANUFACTURING THEREOF
Filed Jan. 24, 1967
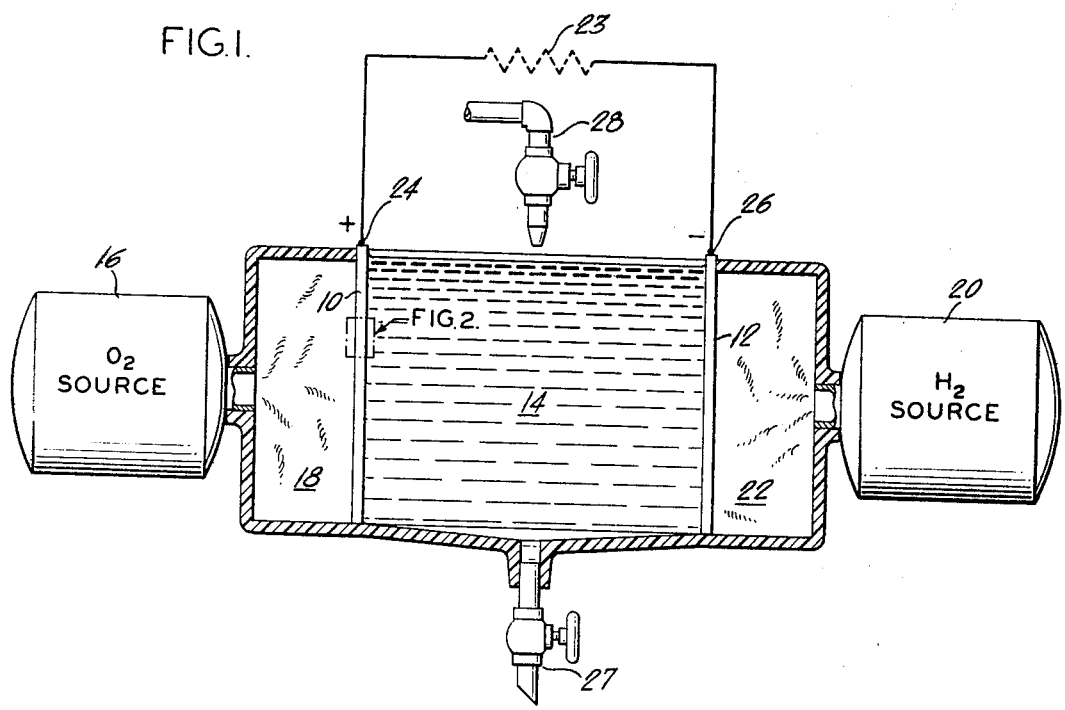
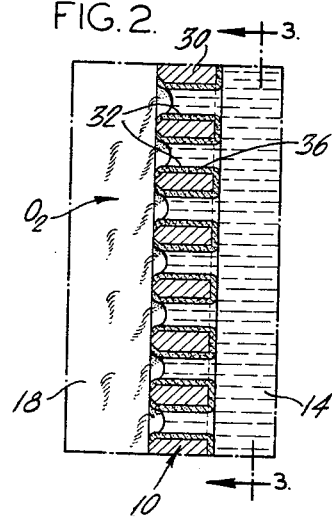
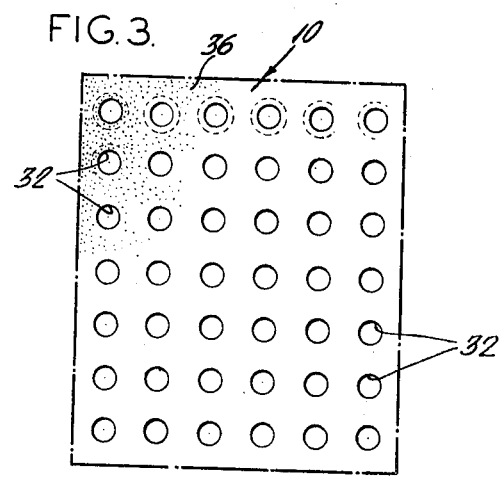
INVENTOR:
CARLO V. BOCCIARELLI
BY Howson & Howson
ATTYS.

United States Patent Office 3,511,714
Patented May 12, 1970

3,511,714
CHEMICAL SOURCE OF ELECTRICAL CURRENT, CATALYST SUITABLE FOR USE THEREIN AND METHOD FOR THE MANUFACTURING THEREOF
Carlo V. Bocciarelli, Spring House, Pa., assignor, by mesne assignments, to Energy & Catalytic Corporation of America Inc., Philadelphia, Pa., a corporation of Pennsylvania
Filed Jan. 24, 1967, Ser. No. 611,350
Int. Cl. H01m 27/10, 13/06; B01j 11/20
U.S. Cl. 136—86
15 Claims

ABSTRACT OF THE DISCLOSURE

A substitute for the expensive platinum catalyst generally used at least at the oxidizing electrode of fuel cells, consisting of an alloy of a noble-metal major constituent with a non-noble polyvalent metal minor constituent which serves to increase the work function of the alloy above that of the major-constituent material along. The major constituent is preferably a stoichiometric ordered alloy of one of the following: $Cu_3Au$; $CuAu$; $Cu_3Au_2$; $Cu_3Ag$; $CuAg$; $Cu_3Ag_2$. The minor constituent is preferably a polyvalent metal such as gallium or aluminum, in an amount (e.g. 5–20%) sufficient to increase substantially the work function of the entire alloy. Preferably the alloy is applied to the oxidizing electrode of the fuel cell device as a coating of flakes having their major faces along the 1,0,0 crystal plane and in contact with the electrolyte of the cell.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to improvements in catalysts suitable for use in chemical sources of electrical current and to electrode structures and forms of catalyst suitable for use in such current sources, as well as to methods for manufacturing such electrodes and catalysts.

While the invention has broader applicability to various types of chemical sources of electrical current, it will be described herein with particular reference to its use in connection with known types of fuel cells operable at relatively low temperatures, in which an oxidizing substance is supplied to a first electrode in contact with an electrolyte and an oxidizable substance is supplied to a second electrode in contact with the electrolyte, the arrangement and the chemical constitution of the oxidizing substance and the oxidizable substance being such that they enter the electrolyte and combine therein, the result of this operation being that a voltage difference is produced between the two electrodes so that a current will be delivered to a load connected between the electrodes. Devices of this general class suitable for operation at reasonably low temperatures are well known, a common type thereof being the hydrogen-oxygen fuel cell in which hydrogen and oxygen are supplied to the cell as the oxidizable and oxidizing materials respectively and combine in the cell to produce water in the electrolyte. The electrode supplied with hydrogen becomes the negative electrode and the electrode supplied with oxygen becomes the positive electrode of the device acting as a source of current.

In order to provide even limited practical utility for such devices, it has heretofore been necessary to use a platinum catalyst at least at the oxidizing electrode and often it is used at both electrodes. While platinum has proved effective for this purpose, its very high cost makes the expense of such cells prohibitively high for many purposes of electrical power generation. If a less costly substitute could be found for the platinum catalyst, the inherent high efficiency of such fuel cells would make them very attractive for a large range of practical power generating purposes. Of course any substitute for the platinum, even if not less expensive, would be advantageous since it would provide an alternative material which could be used for this purpose, and any substitute for platinum which would provide performance superior to that of platinum would also be desirable. In addition, any methods or arrangements which will improve the performance of the catalyst or the ease of making the cell or its electrodes will be similarly adavntageous.

Accordingly it is an object of my invention to provide a new and useful source of electrical power.

Another object is to provide a new and useful catalyst for use in devices which generate electrical power directly by chemical changes.

A still further object is to provide a fuel cell utilizing a new and useful substitute for the platinum usually used as a catalyst therein.

A further object is to provide a new and useful catalyst for fuel cells which is less expensive than platinum catalysts.

Another object is to provide a new and useful catalyst for fuel cells and the like, which utilizes materials more readily available than platinum and which is capable of even better performance in certain respects than those using platinum.

It is also an object to provide a new and useful method for making catalyst-containing electrodes suitable for use in fuel cells and the like.

Another object is to provide a new and useful construction of such catalyst-containing electrodes.

SUMMARY OF THE INVENTION

These and other objects of the invention are achieved as follows. In an electrochemical device employing an oxidizing electrode in contact with an electrolyte and in contact with an oxidizing substance, the portion of the electrode in contact with the electrolyte and oxidizing substance comprises a catalyst which is an alloy of a noble-metal major constituent and a non-noble polyvalent-metal minor constituent which serves to increase the work function of the alloy substantially above that of the major constituent alone. The preferred major constituent of the catalyst is an ordered stoichiometric alloy of copper with a metal selected from the group consisting of silver and gold, while the preferred minority constituent consists of one or more polyvalent metals. More particularly, the preferred noble-metal materials are those contained in the following group: $Cu_3Au$, $CuAu$, $Cu_3Au_2$, $Cu_3Ag$, $CuAg$ and $Cu_3Ag_2$; while the preferred non-noble minority constituent or "dopants" are gallium or aluminum, preferably in an amount of approximately 5 to 20 atomic percent. The catalyst is preferably used in a fuel cell of the hydrogen-oxygen type, it being recognized that in such a cell the source of oxygen may be air and the source of hydrogen may be a complex hydrocarbon fuel such as methane.

In another aspect the invention involves use of a catalyst of single-crystal material which has a major surface corresponding to the 1,0,0 crystal plane, which major face is the one which is exposed to the electrolyte and to the oxidizing and/or oxidizable material, whereby the work function of the catalyst and the current and voltage capabilities of the cell are enhanced.

While not wishing to be bound by the details of any particular theory of the invention, the following are believed to be the more significant underlying considerations explaining the important improvement in catalytic performance provided by the above-described catalyst.

The primary function of the catalyst in fuel cell devices is to facilitate the transfer of electrons between each electrode and the fuel material. The electron transfer which generally limits the performance of the fuel cell is that occurring at the oxidizing electrode and hence it is at the oxidizing electrode that it is especially important to provide the best possible catalytic actions. I have found that the important fundamental characteristic of a metal utilized as a catalyst for such purposes is the concentration of conduction-electrons in that metal at the surface where the interaction with the fuel material is to take place, particularly at the oxidizing electrode; the conduction-electron concentration varies from metal to metal in the same sense as the work function, so that the work function itself is an index of inherent catalytic capability for such purposes. Higher conduction-electron concentrations at the surface of the catalyst, and hence higher work functions, increase markedly the electric field in the electrolyte immediately adjacent the catalyst metal, which in turn produces a very substantial change in the dielectric constant of the electrolyte and in this way enhances the ease of electronic exchanges between the catalyst metal and the fuel material, particularly at the oxidizing electrode. Platinum is a good catalyst for such purposes because it has an unusually high concentration of conduction-electrons. All other elements, so far as is known, have lower concentrations of conduction-electrons and lower work functions than platinum, and are less effective as catalysts.

Alloys of metal elements would normally be expected to provide only a conduction-electron concentration and work function having some mean value between the values for the constituent metals of the alloys. From this viewpoint the possibility of obtaining an adequate or improved substitute for platinum would appear remote. However, it has been found that noble-metal materials having conduction-electron concentrations and work functions substantially lower than those of platinum can be caused to produce substantially enhanced concentrations of conduction-electrons and correspondingly increased work functions, by "doping" them with non-noble metals such as the trivalent metals aluminum and gallium. It has been found that such doping of noble-metal materials with polyvalent metals causes an increase in the number of conduction-electrons without a corresponding increase in the size of the metal crystal lattice, so that the conduction-electron concentration and work function are in fact increased, as mentioned above. This results in enhanced catalytic action and increased current-generating capabilities in a fuel cell using such a catalyst. Stoichiometric ordered alloys of copper with gold or silver using the least-possible amount of expensive materials, such as $Cu_3Ag$, are preferred from the economic viewpoint, and trivalent, as opposed to divalent, dopant metals are preferred since for the same increase in conduction-electron concentration fewer dopant atoms are required and the distortion of the crystal lattice is less.

Utilizing such materials, the cost of the electrode catalyst can be substantially reduced not only without substantial loss in effectiveness of the catalytic action, but with the inherent capability of improvement with respect to platinum by a factor of as much as five times in maximum generated-current density, while at the same time minimizing other undesirable tendencies to produce unwanted products or to degrade unduly with the passage of time, for example. The reduction in the cost of the raw materials for the catalyst will be apppreciated from the fact that the cost of platinum is more than four times that of gold, more than 100 times that of silver, about 6,000 times that of copper, and nearly 12,000 times that of aluminum.

I have further found that the work function and the conduction-electron concentration are greatest for catalyst surfaces in the 1,0,0 plane of the metal crystal, and that most effective catalytic action is obtained by utilizing this plane as the surface exposed to the fuel material and electrolyte, especially at the oxidizing electrode. I have further found that such a catalyst surface may be provided by producing the catalyst in the form of small single-crystalline flakes having their major faces in the 1,0,0 plane and coating the appropriate portion of the cell electrode with such flakes. Use of 1,0,0 surfaces for the catalyst will also enhance the work function of catalyst materials other than those of the present invention.

BRIEF DESCRIPTION OF THE DRAWING

Other objects and features of the invention will become more readily apparent from a consideration of the following detailed description, taken in connection with the accompanying drawings, in which:

FIG. 1 is a schematic representation of a fuel-cell arrangement to which the invention is applicable; and FIGS. 2 and 3 are enlarged fragmentary views, in section and elevation respectively, showing in more detail a portion of the electrode construction of the cell of FIG. 1, including the location of the catalytic material of the invention.

DESCRIPTION OF THE PREFERRED EMBODIMENTS

Referring now to FIG. 1 by way of example only, there are represented therein a pair of spaced electrodes 10 and 12 of electrically-conductive material which retain between them an electrolyte 14, usually made chemically basic, the electrodes being porous so that the electrolyte can penetrate into the interior of the electrodes and fill a multiplicity of passages therein. The outer sides of the electrodes, i.e. the sides opposite from the electrolyte 14, are subjected to the fuel gases under pressure, which also penetrate the pores of the electrodes so as to come into contact with the electrolyte and with the material of the electrodes inside the electrodes. In the example shown, oxygen in the form of $O_2$ is supplied from any suitable source 16 to a pressure chamber 18 on the outer side of electrode 10, and hydrogen in the form of $H_2$ is supplied from any suitable source 20 to a pressure chamber 22 on the outer side of electrode 12. Thus the electrolyte penetrates the electrodes from their inner sides and the $O_2$ and $H_2$ gases penetrate them from their outer surfaces so that, within the pores of the electrodes, the electrolyte, the electrode material and either $O_2$ or $H_2$ are in intimate contact. A typical electrolyte for such purposes is KOH, and typical operating temperatures are from room temperature to about 240° C.

Any suitable electrical load 23 may then be connected electrically between contact 24 of electrode 10 and contact 26 of electrode 12, and a current will be delivered to the load 23 from contacts 24 and 26 due to the fuel-cell action of the electrolyte, the $H_2$ and the $O_2$. In particular, the $H_2$ goes into solution in the electrolyte within the electrode 12 as $H^+$, in the process delivering an electron to electrode 12 for each atom of hydrogen so dissolving, so that contact 26 becomes the negative output terminal of the cell. Similarly, $O_2$ goes into solution in the electrolyte in electrode 10 as $O^{--}$, thereby absorbing electrons from electrode 10 so that contact 24 is the positive electrode of the cell. The $H^+$ ions and the $O^{--}$ ions combine in the electrolyte to form water. A controllable outlet 27 for the electrolyte permits removal of the excess fluid produced by the continuing generation of water in the electrolyte, while a controllable liquid inlet 28 provides for a controlled influx of electrolyte which can be used to maintain the desired level and composition of electrolyte by permitting the controlled addition of water and/or other chemicals, such as KOH, found convenient to enhance the action of the electrolyte and to provide the usual desired basic character of the electrolyte. Arrangements for treating the withdrawn electrolyte and recirculating it to inlet 28 may be used if desired.

The construction and operation of the arrangement of FIG. 1 thus far described in detail are that of a conventional fuel cell. Conventionally the pores of at least the oxygen electrode 10 are coated with platinum, which serves as a catalyst to enhance the current-generating operation. In accordance with the present invention, however, the platinum is replaced by the special catalytic material set forth in general previously herein and now to be described in further detail.

The catalyst utilized in this example is a stoichiometric alloy of noble metals having an ordered crystal structure and containing a minor percentage of a polyvalent non-noble metal. The preferred major-constituent alloy for this purpose is selected from the class consisting of $Cu_3Au$, $CuAu$, $Cu_3Au_2$, $Cu_3Ag$, $CuAg$, and $Cu_3Ag_2$. The preferred minor-constituent non-noble metals are the trivalent metals, preferably aluminum or gallium, the percentage of dopant used depending to some degree upon the particular alloy to which it is added but in general preferably lying within the range of about 5 to 20 atomic percent.

I have also found that best catalytic action is obtained when the catalyst is a single crystal having a major face in the 1,0,0 crystal plane which is in contact with the electrolyte and with the $O_2$ at the oxidizing electrode. Provision of such a crystallographically-oriented major surface enhances the catalytic action of the materials of the present invention; it is also advantageous for other catalysts of cubic lattice structure, including platinum for example, to enhance the catalytic action thereof in fuel cells.

In the present example the electrode 10 comprises a multiply apertured electrically-conductive plate or substrate 30 appopriately mounted and sealed so as to prevent interflow between the oxygen in chamber 18 and the electrolyte 14 except by way of the multiple apertures 32 through the electrode plate. The multiply-apertured plate can be prepared in any of a variety of known ways. For example, it may be prepared from a solid plate of nickel by photoengraving techniques in which a photoresist is applied to the plate, exposed to a predetermined pattern of light so that the resist can be washed off in the areas where apertures are to be formed, and immersed in an etchant which etches holes through the plate in the exposed areas. To enhance its electrical conductivity the plate 30, after removal of all resist and foreign matter, may be flash plated with gold. Other types of eletcrode substrate and methods for making them are now well known in the art and may be used in connection with the embodiments of the present invention. In the present simple example it is assumed that the apertures 32 are generally cylindrical in form. As many as possible are utilized, compatible with retaining sufficient physical strength and sufficiently low electrical resistivity for the electrode.

As is well known, in such electrodes the apertures are made of sufficiently small diameter that the electrolyte will enter somewhat into each aperture but, due to surface tension effects, will not flow through the apertures. The gas, in this case $O_2$, extends into the apertures from the opposite side of the electrode, so that within the electrode there is a three-phase contact between gas, electrolyte and electrode. The portion of the electrode in contact with the gas and the electrolyte within the apertures is coated with a catalyst 36, which in prior-art devices typically comprises platinum but in accordance with the present invention constitutes a substitute material, in this example $Cu_3Au$. Typical thicknesses for the electrode 10 are about 10 mils, typical diameters of the apertures are about 15 mils, and the apertures may typically comprise about 50% of the original electrode plate 30.

One example of a method for preparing and applying the catalyst coating of the invention is as follows. A vacuum evaporation system is set up for the vacuum evaporation of copper and gold sequentially upon a crystal of NaCl. The copper and gold used are preferably of high purity, and supported in appropriate inert refractory boats in the vacuum system. Suitable shields are provided for controllably intercepting evaporation from the copper and gold sources onto the salt crystal. A conventional evaporation rate meter is preferably included adjacent the position of the salt crystal to provide indication of the amount of evaporation at any given time.

The salt crystal is preferably freshly cleaved along a 1,0,0 crystal plane; a typical size for the cleaved surface is about one inch by one inch. The NaCl crystal is heated in vacuum to about 500° C. to further clean its surface and the cooled to about 390° C. and maintained at the latter temperature while the god and copper are evaporated onto it. While the copper and gold may in some cases be evaporated simultaneously, in the present example it is preferred to evaporate them consecutively. In this example the copper and gold are evaporated in a plurality of alternating layers so as to accelerate and facilitate the later interdiffusion of the two materials. The relative amounts of copper and gold so evaporated are in stoichiometric proportions, in this case such as to provide three times as many atoms of copper as of gold. A typical total thickness for the film of copper and gold so evaporated onto the NaCl is about 1,000 angstrom units. The provision of the desired amounts of evaporation will be readily accomplished by one skilled in the art by appropriate control of the evaporation shields in conjunction with indications from the rate meter of the amount of evaporation.

The temperature of the NaCl crystal is thereafter maintained elevated for a sufficient period to produce complete interdiffusion of the gold and copper and sufficient annealing action to produce the desired stoichiometric ordered alloy of the form $Cu_3Au$. Typically this may be accomplished by merely maintaining the NaCl crystal at 390° C. for about one hour.

At this point the $Cu_3Au$ film on the NaCl crystal will have a 1,0,0 crystal orientation, due to its formation on the 1,0,0 surface of the NaCl. The film is stoichiometric in that there is a ratio of three to one between the number of atoms of copper and of gold in it; it is ordered in the sense that domains of substantial volume in it have a periodically-repeating lattice structure, although the order of repetition of the gold and copper atoms may be opposite in various domains within the film. Such stoichiometric ordered alloys, sometimes known as superlattices, are described for example in "Atomic Theory for Students of Metallurgy," by William Hume-Rothery, appearing in the "Institute of Metals Monograph and Report Series No. 3" of the Institute of Metals (London, 1952). Such alloys have the property that when doped with an appropriate material the conduction-electron concentration and the work function of the material can thereby be substantially enhanced. In connection with this, reference is also made to an article entitled "Application of the Epitaxial Film Technique to the Study of the Electronic Structure of Certain Alloys" by Hiroshi Sato at p. 341 of "Single Crystal Films," Francombe and Sato, Pergamon Press, New York, 1964.

If desired, the ordered nature and the crystal orientation of the resultant film of $Cu_3Au$ can be checked at this point by removing the film-bearing NaCl from the vacuum system and examining the film as by electron microscopy or X-ray diffraction techniques, after which it is returned to the vacuum system. Pure aluminum is then evaporated in vacuum to form on the surface of the $Cu_3Au$ film a thin layer of aluminum in the amount desired for the doping material. The exact amount of aluminum so applied depends upon the degree of enhancement of work function desired. In general, the degree of enhancement increases with increasing doping, up to a maximum at which there is no further increase and at which degradation of the properties of the sample begins to occur. Thus if the aluminum is added in an amount less than about 5% the amount of improvement obtained is slight. However, as the amount of aluminum approaches about 20% the desired properties of the material begin to be lost. This is apparently due in many cases to resultant distortions of the ordered lattice and in particular to a change in the crystal structure from face-centered cubic to body-centered cubic. 14 atomic percent of aluminum in $Cu_3Au$ has been found about optimum, and it is preferred not to exceed about 16% to insure uniformity and reproducibility of results. Application of the desired amount of aluminum may be controlled by use of conventional shields and a rate meter.

During application of the aluminum the NaCl is preferably again maintained at 390° C., and when application of the aluminum is complete it is preferably left at this temperature for about an hour to provide the desired uniform diffusion of the aluminum throughout the film.

The NaCl crystal is then removed from the vacuum system. If desired, the alloy film can then be removed by dissolving the NaCl. However, I prefer to rapidly cool the NaCl and film, as by applying a jet of liquid nitrogen to the film. Due to differences in coefficient of thermal expansion between the film and the NaCl, the film will detach, fracture and break up into small flakes preferably of the order of only a few tenths microns in the largest dimension of their major faces. If desired, the resultant flakes can be sieved to remove those greater than a predetermined size.

The resultant powder of $Cu_3Au$ flakes may then be applied to the electrolyte side of electrode plate 30 so as to penetrate the apertures 32 and form a coating thereon. Techniques similar to those which have been utilized in the prior art to deposit platinum black catalysts may be used for this purpose. In the present example it is preferred to form a suspension of the $Cu_3Au$ flakes in a toluene solution of a suitable resin, such as a silicone resin or Teflon. In some cases suitable pressure may be applied to the suspension liquid so as to assure that it will penetrate sufficiently far into the apertures 32 in the electrode plate 30. The resultant liquid coating may then be dried by means of a gentle current of warm air, which not only evaporates the toluene and cures the resin but also assures that the flakes of $Cu_3Au$ lie flat on the underlying electrode plate. The exact thickness of the catalyst thus caused to adhere to the electrode plate 30 can be adjusted for best practical results in any given application, satisfactory results being obtainable in most cases by using as little as ten milligrams of the catalyst per square centimeter of electrode surface.

The resultant electrode 10 is then assembled in the fuel cell as the oxygen electrode, and a similar electrode may be utilized as the hydrogen electrode, although in some cases a simple electrode structure such as a nickel plate without catalyst may be satisfactory for the hydrogen electrode.

The catalyst thus prepared is capable of providing a work function of about 7.8 electron volts, compared with 5.5 electron volts for polycrystalline platinum, and an improvement of at least five times in the maximum current-density which can be generated as compared with that obtained using polycrystalline platinum. The increase in maximum-obtainable cell output voltage is about 16% compared with the cell using the polycrystalline platinum catalyst. The improvement expressed in terms of conduction-electron density, between the 1,0,0 single-crystalline, $Cu_3Au$ and the usual polycrystalline platinum is about 58%.

While the use of the 1,0,0 single-crystalline form of the new catalyst is preferred, advantages not only in cost but also in ultimate capabilities compared to platinum may also be achieved even with the polycrystalline form of my new catalyst, as represented by a work function of about 6.15 compared with 5.5 for platinum. To prepare my new catalyst in polycrystalline form, standard metallurgical techniques may be used in which boules containing the proper stoichiometric amounts of the noble metals and the proper amount of doping materials are formed, but in this case the required annealing periods may be much longer in order to obtain the proper degree of order of the alloy. With this procedure, the annealed boule may be cooled, pulverized, sieved through appropriate meshes, and applied to the cell electrode in a manner completely analogous to that used for applying platinum black, for instance by means of a three-to-one suspension in Teflon.

The methods for preparing the other stoichiometric ordered alloys of copper with silver or gold specified above may be closely similar to that described in detail above for the particular case of $Cu_3Au$. The exact optimum values for annealing and diffusing times and temperatures and amounts of dopant for any particular application will depend upon the specific materials utilized, but may readily be ascertained by reference to prior-art literature describing the formation of stoichiometric ordered alloys and the doping thereof with minor constituents, and by appropriate measurement of the order, crystal orientation and work function of the materials so produced.

As mentioned previously, the major constituent of my new catalyst is a noble-metal material and preferably a stoichiometric ordered alloy of noble metals. The preferred noble-metal materials are the materials of class I-B of the periodic table of the elements, for example the table of S. I. Tompkieff appearing in "A New Periodic Table of the Elements" (Chapman and Hall, London, 1954), namely copper, silver and gold. The minor constituent dopant is a polyvalent metal capable of forming a stable alloy with the major constituent and effective to produce a substantial increase in the work function thereof. Such materials may be chosen from classes II-A, II-B, III-A, III-B, IV-A and IV-B of the above-mentioned periodic table, the preferred materials being aluminum, indium, gallium and in some cases tin. The higher-valency metal dopants are preferred because a relatively smaller atomic percent of dopant is sufficient to produce a given degree of enhancement of work function.

While not wishing to be limited by the details of any particular theory, the following is believed to be an accurate summary of the fundamental nature of the improved effect obtained.

The conduction-electron concentration in a metal varies with work function and plasma frequency of the material, so that if known metal elements are placed in order in accordance with one of these characteristics it will be found that platinum is at the extreme where the conduction-electron concentration is greatest. Certain other materials, such as aluminum and beryllium, approach platinum in this respect but are significantly below it in this characteristic; they also have the undesirable characteristic of very readily forming compounds, such as oxides, on their surfaces, which creates problems if it is attempted to use them as catalysts. The materials of the invention do not possess these drawbacks of materials such as aluminum and beryllium, and furthermore have unexpectedly high catalytic action due to their high concentration of conduction electrons, and in fact have the capability when made in the optimum manner of exceeding platinum in this respect. The high concentration of conduction electrons is effective in promoting catalytic action because of the very high electric field strengths it produces in the electrolyte very close to the surface of the catalyst (e.g. within a few angstrom units of the surface). These very intense local fields produce marked reductions in the dielectric constant of the electrolyte at the catalyst surface and thereby affect the energy levels of electrons associated with atoms in the electrolyte in such manner that the desired electron transfer is ficilitated and the current capabilities of the cell greatly enhanced.

While the specific group of ordered alloys set forth above are especially effective in permitting enhancement of their catalytic action capability by doping them with donor impurities, it is also possible to obtain some enhancement of the work function of an elemental noble metal by doping it with a minor amount of a polyvalent metal, but the effect is less pronounced than in the case of the doped stoichiometric ordered noble-metal alloys. For example, doping of copper with tin produces some degree of enhancement of the work function of copper alone and hence improved its capabilities as a catalyst in a fuel cell.

Accordingly there has been provided a new class of catalytic materials suitable for use in fuel cells and the like, which materials are compatible with the other requirements of fuel cells with regard to poisoning, deterioration, generation of undesired byproducts, etc., and which not only offer alternatives to platinum but also make possible reductions in cost of the fuel cell and, when optimum materials are utilized, indeed make possible even better current and voltage generating performance than is obtainable with platinum as the catalyst.

While the invention has been described with particular reference to specific embodiments thereof in the interest of complete definiteness, it will be understood that it may be embodied in a variety of other forms without departing from the scope of the invention as defined by the appended claims.

I claim:
1. An electrical current source, comprising:
   an electrolyte; a first electrode and a second electrode both in contact with said electrolyte; means for supplying an oxidizing material to the region of contact between said electrolyte and at least a portion of said first electrode; means for supplying an oxidizable fuel to the region of contact between said electrolyte and at least a portion of said second electrode; said portion of said first electrode comprising a catalyst;
   said current source being characterized in that said catalyst consists essentially of a stoichiometric ordered alloy of copper with gold and a minor atomic percentage of polyvalent metal in said alloy for increasing the work function of said alloy.

2. The current source of claim 1, in which said polyvalent metal consists essentially of trivalent metal.

3. The current source of claim 2, in which said polyvalent metal is a metal selected from the class consisting of gallium and aluminum.

4. The current source of claim 1, in which said stoichiometric ordered alloy is selected from the group consisting of $Cu_3Au$, $CuAu$, and $Cu_3Au_2$.

5. The current source of claim 1, in which said oxidizing material is oxygen and said oxidizable fuel is hydrogen.

6. A source of electrical current, comprising:
   an electrolyte;
   an oxidizing electrode in contact with said electrolyte;
   means for supplying an oxidizing substance to a region of contact between said oxidizing electrode and said electrolyte;
   a second electrode in contact with said electrolyte;
   means for supplying an oxidizable fuel to a region of said second electrode in contact with said electrolyte; and
   a catalyst substance in said region of contact of one of said electrodes;
   wherein the major faces of said catalyst substance which are in contact with said electrolyte lie predominantly in the 1,0,0 crystal plane of said catalyst substance.

7. An oxidizing electrode for a fuel cell device, comprising: an electrically-conductive substrate and a coating thereon containing a stoichiometric ordered alloy of copper and gold with a minor component of a polyvalent non-noble metal in said alloy.

8. The method of providing a catalyst on an electrode for a fuel cell, comprising:
   forming a film of copper and another material selected from the group consisting of gold and silver in stoichiometric proportions by applying alternating layers of copper and said other material to a substrate;
   heating said film to interdiffuse said copper and said other material and to form a stoichiometric ordered alloy thereof;
   applying a layer of a polyvalent dopant metal to said ordered alloy;
   heating said layer and said ordered alloy to produce homogeneous diffusion of said dopant into said alloy;
   then removing said film from said substrate and applying the material thereof to said electrode as an adherent coating thereon.

9. The method of claim 8, in which said substrate is a single-crystal having a 1,0,0 oriented surface on which said film is formed.

10. The method of claim 9, in which said substrate is a heated crystal of NaCl.

11. The method of claim 8, in which removing said film comprises chilling it rapidly to cause said film to fall off in fine-flake form, and said applying of said film material to said electrode comprises suspending said flakes in liquid suspension, coating a portion of said electrode with said suspension, and drying said suspension to produce said adherent coating.

12. An electrical current source, comprising:
   an electrolyte; a first electrode and a second electrode both in contact with said electrolyte; means for supplying an oxidizing material to the region of contact between said electrolyte and at least a portion of said first electrode; means for supplying an oxidizable fuel to the region of contact between said electrolyte and at least a portion of said second electrode; said portion of said first electrode comprising a catalyst;
   said current source being characterized in that said catalyst consists essentially of a stoichiometric ordered alloy of copper with a metal selected from the group consisting of silver and gold and a minor atomic percentage of polyvalent metal for increasing the work function of said alloy; and
   the surface of said catalyst exposed to said electrolyte being predominantly in the 1,0,0 crystal plane.

13. The current source of claim 12, in which said catalyst is in the form of particles having diameters of the order of tenths of microns.

14. The current source of claim 1, in which said catalyst is in finely divided form.

15. The current source of claim 1, in which said material is in the form of particles having diameters of the order of tenths of microns.

References Cited

UNITED STATES PATENTS

| 3,269,867 | 8/1966 | Fabel | 136—120 |
| 3,291,753 | 12/1966 | Thompson | 136—120 |
| 3,325,311 | 6/1967 | Huff | 136—86 |

FOREIGN PATENTS

| 1,095,418 | 12/1967 | United Kingdom. |

OTHER REFERENCES

J. Newton: Extractive Metallurgy (1959), pp. 183–184.

WINSTON A. DOUGLAS, Primary Examiner

P. D. ROSENBERG, Assistant Examiner

U.S. Cl. X.R.

136—120; 252—460